United States Patent
Tseng et al.

(10) Patent No.: US 11,087,427 B2
(45) Date of Patent: Aug. 10, 2021

(54) BANDWIDTH-LIMITED SYSTEM AND METHOD FOR DYNAMICALLY LIMITING MEMORY BANDWIDTH OF GPU FOR UNDER BANDWIDTH-LIMITED SYSTEM

(71) Applicant: REALTEK SEMICONDUCTOR CORP., Hsinchu (TW)

(72) Inventors: Yi-Chen Tseng, Hsinchu (TW); Ming-Yang Tseng, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 191 days.

(21) Appl. No.: 16/054,370

(22) Filed: Aug. 3, 2018

(65) Prior Publication Data
US 2019/0272611 A1    Sep. 5, 2019

(30) Foreign Application Priority Data
Mar. 1, 2018   (TW) ................. 107106878

(51) Int. Cl.
*G06T 1/20* (2006.01)
*G06T 1/60* (2006.01)
(Continued)

(52) U.S. Cl.
CPC ................. *G06T 1/20* (2013.01); *G06T 1/60* (2013.01); *H04N 19/127* (2014.11);
(Continued)

(58) Field of Classification Search
None
See application file for complete search history.

(56) References Cited

U.S. PATENT DOCUMENTS 5,675,387 A * 10/1997 Hoogenboom ........ H04N 19/61
375/240.15
5,818,967 A * 10/1998 Bhattacharjee ........ H04N 19/61
382/233

(Continued)

FOREIGN PATENT DOCUMENTS

TW    200901040 A    1/2009
TW    201416864 A    5/2014

OTHER PUBLICATIONS

IP.Com search report.*

*Primary Examiner* — Mohammad J Rahman
(74) *Attorney, Agent, or Firm* — Birch, Stewart, Kolasch & Birch, LLP (57) ABSTRACT

A method for dynamically limiting a memory bandwidth of a graphics processing unit (GPU) is applicable to a bandwidth-limited system. The bandwidth-limited system includes an audio/video decoder and a GPU. The method includes detecting a plurality of decoding times of a plurality of frames of an audio/video decoded by an audio/video decoder, and adjusting a max grant amount of a memory bandwidth of a GPU according to the plurality of decoding times of the plurality of frames and a target time. Therefore, in the case where the total memory bandwidth is limited, the memory bandwidth of the GPU is limited by the performance of the corresponding audio/video decoder such that, during audio/video playback, the effect of audio/video playback can be prevented from being affected and at the same time a better graphical user interface can be provided.

15 Claims, 5 Drawing Sheets

```
┌─────────────────────────────────────────────────────┐
│  Detecting decoding times of frames of audio/video  │    S11
│  decoded by audio/video decoder                     │
└─────────────────────────────────────────────────────┘
                         │
                         ▼
┌─────────────────────────────────────────────────────┐
│  Adjusting max grant amount of memory bandwidth     │    S13
│  of GPU according to decoding times of frames       │
│  and target time                                    │
└─────────────────────────────────────────────────────┘
                         │
                         ▼
┌─────────────────────────────────────────────────────┐
│  Confirming access request of GPU to memory based   │    S15
│  on max grant amount of memory bandwidth of GPU     │
└─────────────────────────────────────────────────────┘
```

(51) Int. Cl.
*H04N 19/172* (2014.01)
*H04N 19/423* (2014.01)
*H04N 19/44* (2014.01)
*H04N 19/127* (2014.01)

(52) U.S. Cl.
CPC ......... *H04N 19/172* (2014.11); *H04N 19/423* (2014.11); *H04N 19/44* (2014.11)

(56) References Cited

U.S. PATENT DOCUMENTS

| | | | | |
|---|---|---|---|---|
| 6,240,492 B1* | 5/2001 | Foster | ................ | G06F 13/4243 |
| | | | | 711/149 |
| 7,039,706 B1* | 5/2006 | Parker | ................ | H04L 12/2856 |
| | | | | 370/237 |
| 7,369,614 B2* | 5/2008 | Moutin | ................ | H04N 19/61 |
| | | | | 375/240 |
| 8,068,114 B2* | 11/2011 | Andre | ................ | G06F 13/4234 |
| | | | | 345/541 |
| 8,248,425 B2 | 8/2012 | Ghosh | | |
| 8,907,987 B2 | 12/2014 | Chowdhry et al. | | |
| 9,172,655 B1* | 10/2015 | Dropps | ................ | H04L 49/254 |
| 9,313,249 B2* | 4/2016 | Soroushian | ............ | H04L 47/12 |
| 9,992,741 B2* | 6/2018 | Trainin | ............ | H04W 52/0216 |
| 2001/0026592 A1* | 10/2001 | Moutin | ................ | H04N 19/61 |
| | | | | 375/240.28 |
| 2002/0065991 A1* | 5/2002 | Fortuna | ............... | G06F 12/0837 |
| | | | | 711/141 |
| 2005/0204085 A1* | 9/2005 | Fukuyama | ............ | G06F 13/161 |
| | | | | 710/244 |
| 2005/0259578 A1* | 11/2005 | Shinagawa | ............. | H04L 47/10 |
| | | | | 370/230 |
| 2007/0116025 A1* | 5/2007 | Yadlon | .................... | H04L 47/50 |
| | | | | 370/412 |
| 2007/0171933 A1* | 7/2007 | Sammour | ......... | H04W 74/0816 |
| | | | | 370/447 |
| 2007/0257926 A1* | 11/2007 | Deb | .................... | G06F 12/0607 |
| | | | | 345/568 |
| 2008/0189522 A1* | 8/2008 | Meil | .................... | G06F 9/30079 |
| | | | | 712/220 |
| 2009/0160865 A1* | 6/2009 | Grossman | ................ | H04N 9/87 |
| | | | | 345/502 |
| 2011/0063315 A1* | 3/2011 | Ghosh | ................ | G06F 3/1423 |
| | | | | 345/536 |
| 2011/0242974 A1* | 10/2011 | Das | ........................ | H04L 47/781 |
| | | | | 370/230 |
| 2012/0098864 A1* | 4/2012 | Chowdhry | ............... | G09G 5/14 |
| | | | | 345/660 |
| 2012/0318870 A1* | 12/2012 | Ren | ........................ | H04N 9/045 |
| | | | | 235/469 |
| 2014/0086070 A1* | 3/2014 | Saund | .................... | G06F 13/1605 |
| | | | | 370/252 |
| 2014/0280679 A1* | 9/2014 | Dey | ........................ | H04L 65/80 |
| | | | | 709/213 |
| 2014/0365651 A1* | 12/2014 | Soroushian | ............. | H04L 47/12 |
| | | | | 709/224 |
| 2015/0028102 A1* | 1/2015 | Ren | .................... | H04N 5/37213 |
| | | | | 235/454 |
| 2017/0034717 A1* | 2/2017 | Yuan | .................... | H04W 28/18 |
| 2017/0303273 A1* | 10/2017 | Jin | .................... | H04W 72/1263 |
| 2018/0220435 A1* | 8/2018 | Cariou | .................. | H04W 72/12 |
| 2018/0299952 A1* | 10/2018 | Koker | ........................ | G06T 7/80 |
| 2018/0300098 A1* | 10/2018 | Vembar | ........................ | G09G 5/363 |
| 2018/0308194 A1* | 10/2018 | Shankar | .................. | G06F 1/324 |
| 2020/0107247 A1* | 4/2020 | Ioffe | .................... | H04W 76/10 |

* cited by examiner

BANDWIDTH-LIMITED SYSTEM AND METHOD FOR DYNAMICALLY LIMITING MEMORY BANDWIDTH OF GPU FOR UNDER BANDWIDTH-LIMITED SYSTEM

CROSS-REFERENCE TO RELATED APPLICATION

This non-provisional application claims priority under 35 U.S.C. § 119(a) to Patent Application No. 107106878 filed in Taiwan, R.O.C. on Mar. 1, 2018, the entire contents of which are hereby incorporated by reference.

BACKGROUND

Technical Field

The instant disclosure generally relates to a memory bandwidth allocation technology in a bandwidth-limited system and, more particularly, to a bandwidth-limited system and a method for dynamically limiting a memory bandwidth of a GPU under the bandwidth-limited system.

Related Art

Nowadays, the system-on-chip (SoC) technology has been widely used in various electronic devices such as televisions (TVs), setup boxes (STBs), over-the-top (OTT) boxes, personal computers (PCs), mobile phones, tablet PCs, and DVD players.

The SoC is used for decoding audio/video with on-screen display (OSD). On the SoC, the on-screen display is processed by a GPU. Additionally, the memory bandwidth required by the audio/video decoder for decoding audio/video changes with the size of content of the audio/video. The memory bandwidth required by the GPU for processing on-screen display is also variable. However, the total memory bandwidth of the SoC is limited. Therefore, when the memory bandwidth required by the audio/video decoder and the memory bandwidth required by the GPU are both large, the performance of the audio/video decoder and the performance of the GPU decrease.

SUMMARY

Compared with on-screen display, audio/video decoding directly affects the smoothness of audio/video playback as well as the user's audiovisual experience. Therefore, when the memory bandwidth is insufficient, maintaining the performance of the audio/video decoder is given a higher priority. To achieve the above, in one embodiment of the instant disclosure, a method for dynamically limiting a memory bandwidth of a GPU is provided applicable to a bandwidth-limited system. The bandwidth-limited system includes an audio/video decoder and a GPU. The method includes detecting a plurality of decoding times of a plurality of frames of an audio/video decoded by an audio/video decoder, and adjusting a max grant amount of a memory bandwidth of the GPU according to the plurality of decoding times of the plurality of frames and a target time.

In another embodiment of the instant disclosure, a bandwidth-limited system is provided, which includes a bus, a GPU, an audio/video decoder, a memory controller, and a central processing unit (CPU). The GPU, the audio/video decoder, the memory controller, and the CPU are coupled to the bus. Here, the audio/video decoder is configured to sequentially read and decode a plurality of frames of an audio/video via the bus. The CPU is configured to detect a plurality of decoding times of the plurality of frames and adjust a max grant amount of a memory bandwidth of the GPU according to the plurality of decoding times of the plurality of frames and a target time. The memory controller is configured to confirm an access request of the GPU to a memory based on the max grant amount of the memory bandwidth.

In summary, the bandwidth-limited system and the method for dynamically limiting a memory bandwidth of a GPU according to the instant disclosure can dynamically limit the memory bandwidth of the GPU according to the performance of audio/video decoding in the case where the total amount of memory bandwidth is limited so as to maintain the effect of audio/video playback during audio/video playback.

BRIEF DESCRIPTION OF THE DRAWINGS

This disclosure will become more fully understood from the detailed description given herein below for illustration only, and thus not limitative of this disclosure, wherein.

DETAILED DESCRIPTION

Figure 1:
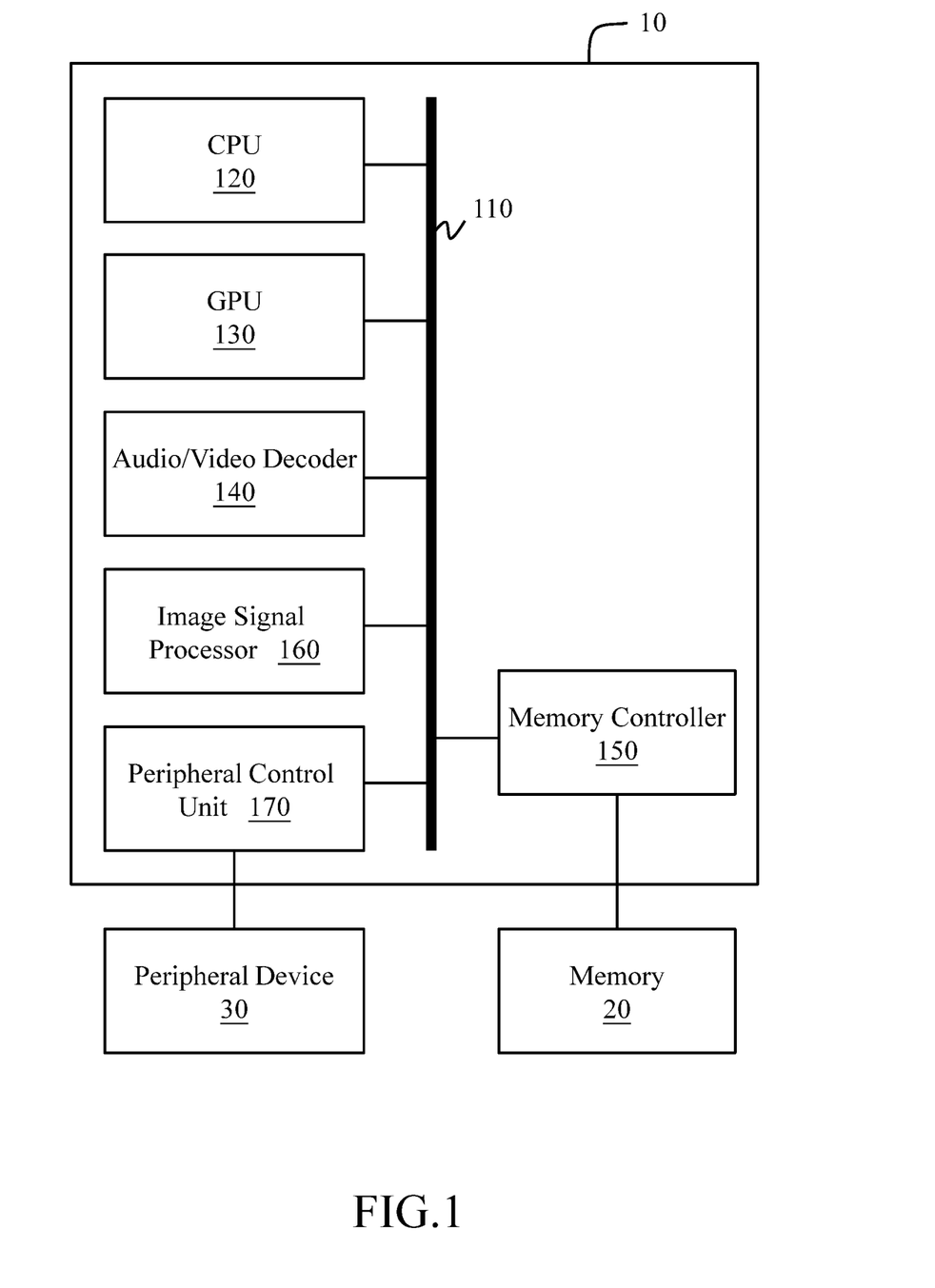
FIG. 1 a schematic diagram of a bandwidth-limited system according to one embodiment of the instant disclosure.

Referring to FIG. 1, the bandwidth-limited system 10 may include a bus 110, a CPU 120, a GPU 130, an audio/video decoder 140 and a memory controller 150. The CPU 120, the GPU 130, the audio/video decoder 140 and the memory controller 150 are coupled to bus 110, respectively, and communicate with one another (for example, performing various exchanges of data and/or control signals) through the bus 110. More particularly, the bandwidth-limited system 10 may be, for example, a system-on-a-chip (SoC).

In one embodiment, the memory controller 150 may be coupled to one or more memories 20 outside the bandwidth-limited system 10. The memory controller 150 can control data access by the components (for example, the CPU 120, the GPU 130, the audio/video decoder 140, etc.) in the bandwidth-limited system 10 to the memory 20. Generally speaking, for example, when any of the components wants to access the memory 20, the component first sends an access request to the memory controller 150. The memory controller 150 confirms whether there is sufficient unused memory bandwidth based on the data bandwidth recorded in the access request. When there is still sufficient unused memory bandwidth, the memory controller 150 will permit the access request. In the meantime, the component can access the memory 20. Conversely, when there is insufficient unused memory bandwidth, the memory controller 150 will reject the access request. The memory 20 may be, for example, a double data rate synchronous dynamic random-access memory (DDR SDRAM).

During audio/video playback, the audio/video decoder 140 sequentially reads each of a plurality of frames of an audio/video from the memory 20 and decodes the read frame. During the decoding process, the CPU 120 detects the decoding time of each frame decoded by the audio/video decoder 140. In other words, the CPU 120 measures the time when the audio/video decoder 140 decodes each frame to acquire the decoding time of each frame.

In addition, the CPU 120 adjusts a max grant amount of a memory bandwidth of the GPU 130 according to a plurality of decoding times of a predetermined number of frames and a target time. In other words, the CPU 120 sets the max grant amount of the memory bandwidth of the GPU 130 in the memory controller 150. More particularly, the predetermined number is plural and is a positive integer. Here, the predetermined number is related to the number of frames that can be stored in the buffer space provided by the memory 20. More particularly, the predetermined number may be, for example, 5 (i.e., 5 frames), 10 (i.e., 10 frames) or 20 (i.e., 20 frames). In one embodiment, CPU 120 may adjust the max grant amount of the memory bandwidth of the GPU 130 based on the decoding times of consecutive frames in the audio/video. Taking the predetermined number being 10 as an example, after the audio/video decoder 140 completes decoding the 10th frame of the audio/video, the CPU 120 adjusts the max grant amount of the memory bandwidth of the GPU 130 according to the decoding times of the first to the 10th frames and the target time. Next, after the audio/video decoder 140 completes decoding the 11th frame of the audio/video, the CPU 120 adjusts the max grant amount of the memory bandwidth of the GPU 130 according to the decoding times of the second to the 11th frames and the target time. Then, after the audio/video decoder 140 completes decoding the 12th frame of the audio/video, the CPU 120 adjusts the max grant amount of the memory bandwidth of the GPU 130 according to the decoding times of the third to the 12th frames and the target time, and so on. In another embodiment, the CPU 120 may also adjust the max grant amount of the memory bandwidth of the GPU 130 according to the decoding times of discrete frames in the audio/video.

When the GPU 130 issues an access request to the memory controller 150, the memory controller 150 confirms whether the accumulative amount of memory bandwidth that has been granted to the GPU 130 plus the data bandwidth recorded in the access request has exceeded the max grant amount. If not, the memory controller 150 permits the access request of the GPU 130. Otherwise, the memory controller 150 rejects the access request of the GPU 130.

In one embodiment, in the step of adjusting the max grant amount of the memory bandwidth of the GPU 130 according to the decoding times of the plurality of frames and the target time, when the audio/video decoder 140 completes decoding any of the frames of the audio/video, the CPU 120 calculates a time difference between the decoding time of the frame and the target time. Next, the CPU 120 accumulates the time difference between a predetermined number of consecutive frames and the target time, respectively, to acquire an accumulative time and controls the memory controller 150 to adjust the max grant amount of the memory bandwidth of the GPU 130 according to the acquired accumulative time and a threshold. In this embodiment, the target time is defined as an ideal decoding time for decoding a "single" one of the plurality of frames. The set value of the target time is related to the frame rate of the audio/video. For example, assume that the frame rate of the audio/video is 60 frames per second (fps), the target time may be shorter than or equal to 1/60 seconds.

In one aspect, when the audio/video decoder 140 completes decoding any of the frames of the audio/video, the CPU 120 calculates a time difference between the decoding time of the frame and the target time by subtracting the decoding time of the frame from the target time. The CPU 120 accumulates the time difference between a predetermined number of consecutive frames and the target time, respectively, to acquire an accumulative time and compares the acquired accumulative time with a threshold. When the accumulative time is shorter than the threshold (which indicates that the performance of the audio/video decoder 140 is relatively poor), the CPU 120 sets the max grant amount of the memory bandwidth of the GPU 130 to a first value. Conversely, when the accumulative time is longer than or equal to the threshold (which indicates that the performance of the audio/video decoder 140 is relatively good), the CPU 120 sets the max grant amount of the memory bandwidth of the GPU 130 to a second value. More particularly, the first value is smaller than the second value. In this aspect, the target time is defined as an ideal decoding time for decoding a "single" frame.

In another aspect, when the audio/video decoder 140 completes decoding any of the frames of the audio/video, the CPU 120 calculates a time difference between the decoding time of the frame and the target time by subtracting the target time from the decoding time of the frame. The CPU 120 accumulates the time difference between a predetermined number of consecutive frames and the target time, respectively, to acquire an accumulative time and compares the acquired accumulative time with a threshold. When the accumulative time is longer than the threshold (which indicates that the performance of the audio/video decoder 140 is relatively poor), the CPU 120 sets the max grant amount of the memory bandwidth that the memory controller 150 can grant the GPU 130 to a first value. Conversely, when the accumulative time is shorter than or equal to the threshold (which indicates that the performance of the audio/video decoder 140 is relatively good), the CPU 120 sets the max grant amount of the memory bandwidth that the memory controller 150 can grant the GPU 130 to a second value. More particularly, the first value is smaller than the second value. In this aspect, the target time is defined as an ideal decoding time for decoding a "single" frame.

In another embodiment, in the step of adjusting the max grant amount of the memory bandwidth of the GPU 130 according to the decoding times of the plurality of frames and the target time, when the audio/video decoder 140 completes decoding any of the frames of the audio/video, the CPU 120 accumulates the decoding times of a predetermined number of frames (the current frame and the previous frames) to acquire an accumulative time and compares the acquired accumulative time with the target time. It should be noted that, in this embodiment, the target time is defined as an ideal decoding time for decoding a "predetermined number" of frames, and the set value of the target time is also related to the frame rate of the audio/video. When the acquired accumulative time is longer than the target time (which indicates that the performance of the audio/video decoder 140 is relatively poor), the CPU 120 sets the max grant amount of the memory bandwidth of the GPU 130 in the memory controller 150 to a first value. Conversely, when the acquired accumulative time is shorter than or equal to the target time (which indicates that the performance of the audio/video decoder 140 is relatively good), the CPU 120 sets the max grant amount of the memory bandwidth of the GPU 130 in the memory controller 150 to a second value. More particularly, the first value is shorter than the second value. The max grant amount of the memory bandwidth of the GPU 130 is the total amount of bandwidth request that the memory controller 150 can grant the GPU 130.

In some embodiments, the bandwidth-limited system 10 may further include an image signal processor 160. The image signal processor 160 is coupled to the bus 110 and communicates with the other components (for example, performing various exchanges of data and/or control signals) through the bus 110. The image signal processor 160 is configured to perform the display of decoded frames.

In addition, the GPU 130 is configured to provide a graphical user interface (GUI). When the GPU 130 provides the GUI, the image signal processor 160 may also combine and display the GUI and the decoded frames.

In some embodiments, the bandwidth-limited system 10 may further include at least one peripheral control unit 170. The peripheral control unit 170 is coupled to the bus 110 and communicates with the other components (for example, performing various exchanges of data and/or control signals) through the bus 110.

Herein, each peripheral control unit 170 can be coupled to a peripheral device 30 outside the bandwidth-limited system 10 and control the operation of the peripheral device 30 coupled thereto. Among them, the peripheral device 30 may be, for example, a universal serial bus (USB) device, a secure digital (SD) card, or the like.

Figure 2:
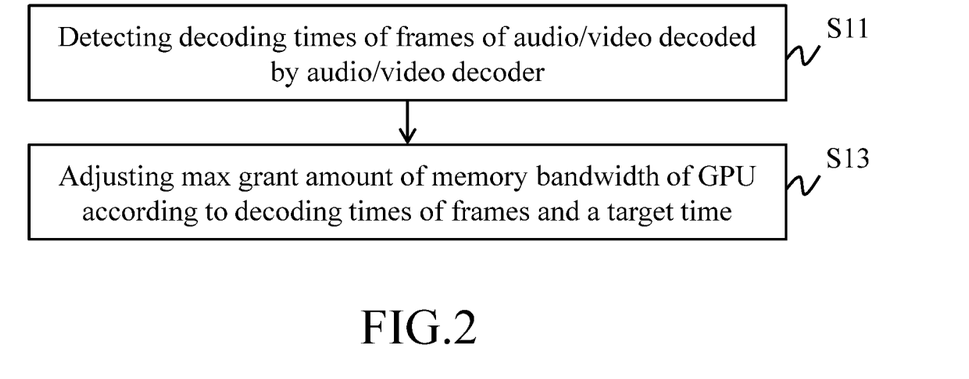
FIG. 2 is a flowchart of a method for dynamically limiting a memory bandwidth of a GPU according to one embodiment of the instant disclosure.

FIG. 2 is a flowchart of a method for dynamically limiting a memory bandwidth of a GPU according to one embodiment of the instant disclosure. Referring to FIG. 2, a method for dynamically limiting a memory bandwidth of a GPU is provided applicable to aforementioned bandwidth-limited system 10. The method includes: detecting a plurality of decoding times of a predetermined number of frames of an audio/video decoded by the audio/video decoder 140 (Step S11); and adjusting a max grant amount of the memory bandwidth of the GPU 130 according to the plurality of decoding times of the predetermined number of frames and a target time (Step S13). More particularly, the predetermined number is plural and is a positive integer.

Figure 3:
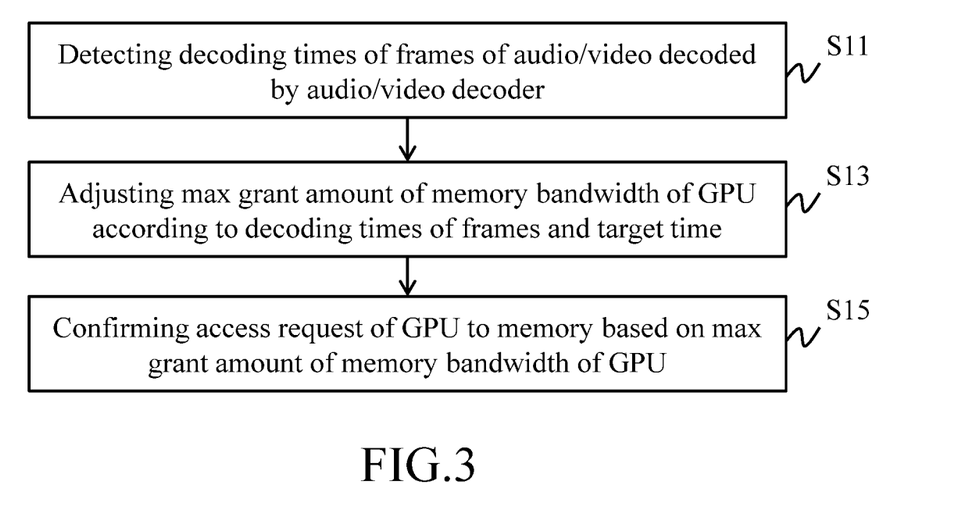
FIG. 3 is a flowchart of a method for dynamically limiting a memory bandwidth of a GPU according to another embodiment of the instant disclosure.

In one embodiment, referring to FIG. 3, the method for dynamically limiting a memory bandwidth of a GPU may further include confirming an access request of the GPU 130 to a memory 20 based on the max grant amount of the memory bandwidth of the GPU 130 (Step S15) after the Step S13.

Figure 4:
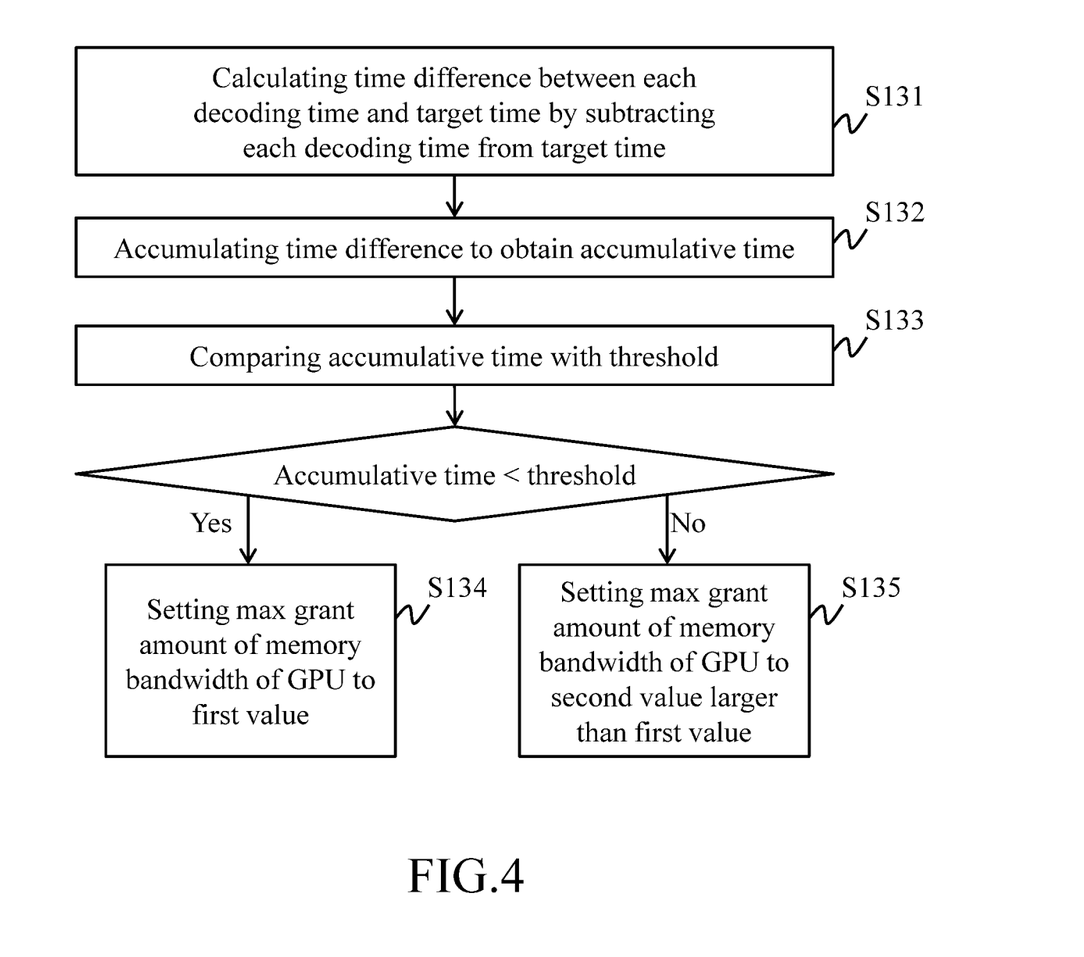
FIG. 4 is a detailed flowchart in Step S13 according to one embodiment.

In one embodiment, referring to FIG. 4, Step S13 includes: calculating a time difference between one of the plurality of decoding times and the target time, respectively, by subtracting the one of the plurality of decoding times from the target time (Step S131); accumulating the time difference to acquire an accumulative time (Step S132); comparing the accumulative time with the threshold (Step S133); setting the max grant amount of the memory bandwidth of the GPU 130 to a first value when the accumulative time is shorter than the threshold (Step S134); and setting the max grant amount of the memory bandwidth of the GPU 130 to a second value larger than the first value when the accumulative time is longer than or equal to the threshold (Step S135). In this embodiment, the target time is defined as an ideal decoding time for decoding a "single" frame.

Figure 5:
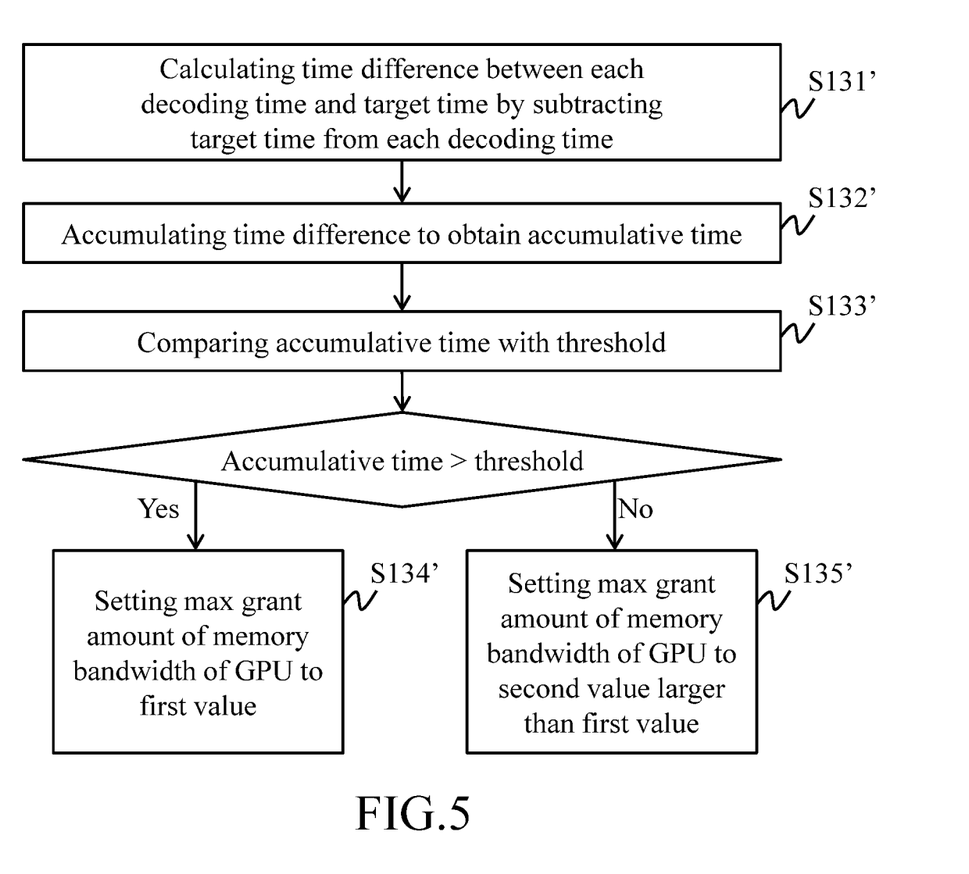
FIG. 5 is a detailed flowchart in Step S13 according to another embodiment.

In another embodiment, referring to FIG. 5, Step S13 includes: calculating a time difference between each of a predetermined number of decoding times and the target time, respectively, by subtracting the target time from each of the predetermined number of decoding times (Step S131'); accumulating the time difference to acquire an accumulative time (Step S132'); comparing the acquired accumulative time with the threshold (Step S133'); setting the max grant amount of the memory bandwidth of the GPU 130 to a first value when the accumulative time is longer than the threshold (Step S134'); and setting the max grant amount of the memory bandwidth of the GPU 130 to a second value larger than the first value when the accumulative time is shorter than or equal to the threshold (Step S135'). In this embodiment, the target time is defined as an ideal decoding time for decoding a "single" frame.

Figure 6:
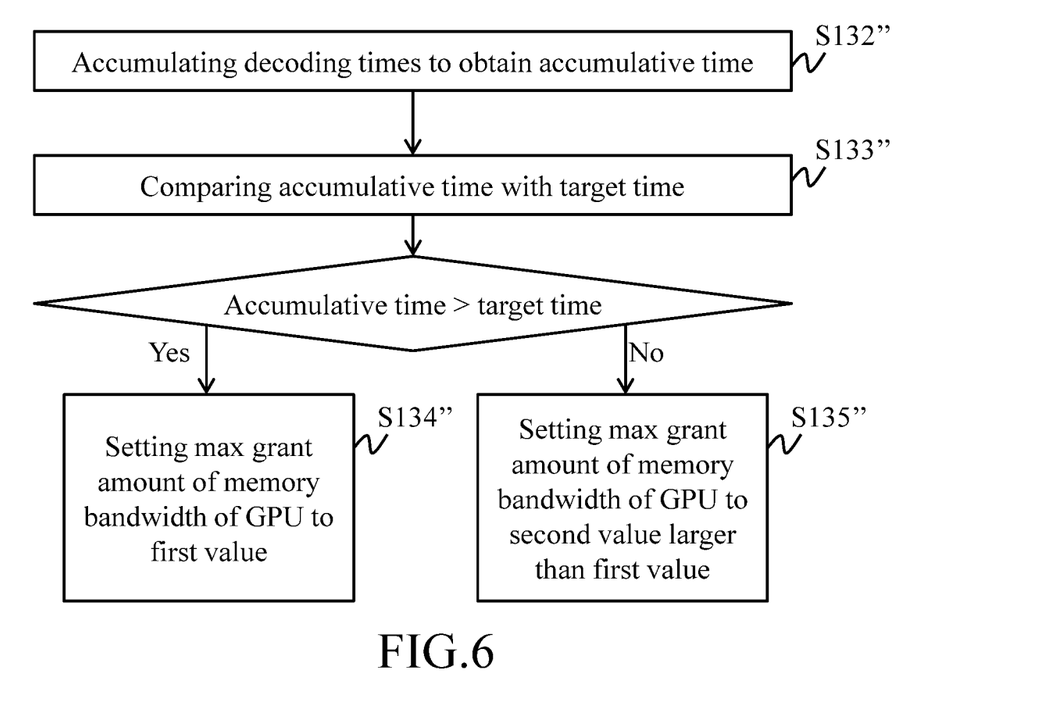
FIG. 6 is a detailed flowchart in Step S13 according to another embodiment.

In still another embodiment, referring to FIG. 6, Step S13 includes: accumulating a plurality of decoding times of a predetermined number of frames to acquire an accumulative time (Step S132"); comparing the acquired accumulative time with the target time (Step S133"); setting the max grant amount of the memory bandwidth of the GPU 130 to a first value when the accumulative time is longer than the target time (Step S134"); and setting the max grant amount of the memory bandwidth of the GPU 130 to a second value which is larger than the first value when the accumulative time is shorter than or equal to the target time (Step S135"). In the present embodiment, the target time is defined as an ideal decoding time for decoding the "predetermined number" of frames.

In some embodiments, the predetermined number of frames may be continuous in time. In other embodiments, the predetermined number of frames may also be discontinuous in time.

In summary, the bandwidth-limited system and the method for dynamically limiting a memory bandwidth of a GPU according to the instant disclosure can dynamically limit the memory bandwidth of the GPU according to the performance of audio/video decoding in the case where the total amount of memory bandwidth is limited so as to maintain the effect of audio/video playback during audio/video playback.

What is claimed is:

1. A method for dynamically limiting a memory bandwidth of a graphics processing unit (GPU), applicable to a bandwidth-limited system comprising an audio/video decoder and the GPU, the method comprising:
    detecting a plurality of decoding times of a plurality of frames of an audio/video decoded by the audio/video decoder, each of the plurality of decoding times being a time actually spent by the audio/video decoder for decoding a respective one of the plurality of frames of the audio/video; and
    adjusting a max grant amount of the memory bandwidth of the GPU according to the plurality of decoding times of the plurality of frames and a target time,
    wherein the max grant amount of the memory bandwidth of the GPU is a threshold for the memory controller to determine whether an access request issued by the GPU is permitted or not.

2. The method according to claim 1, wherein the target time is an ideal decoding time for decoding one of the plurality of frames.

3. The method according to claim 2, wherein the step of adjusting the max grant amount of the memory bandwidth of the GPU according to the plurality of decoding times of the plurality of frames and the target time comprises:
    calculating a time difference between one of the plurality of decoding times and the target time, respectively;
    accumulating the time difference to obtain an accumulative time; and adjusting the max grant amount of the memory bandwidth according to the accumulative time and a threshold.

4. The method according to claim 3, wherein the time difference equals to a difference defined by subtracting the one of the plurality of decoding times from the target time, and the step of adjusting the max grant amount of the memory bandwidth according to the accumulative time and the threshold comprises:
comparing the accumulative time with the threshold;
setting the max grant amount of the memory bandwidth to a first value when the accumulative time is shorter than the threshold; and
setting the max grant amount of the memory bandwidth to a second value when the accumulative time is longer than or equal to the threshold, wherein the first value is smaller than the second value.

5. The method according to claim 3, wherein the time difference equals to a difference defined by subtracting the target time from the one of the plurality of decoding times, and the step of adjusting the max grant amount of the memory bandwidth according to the accumulative time and the threshold comprises:
comparing the accumulative time with the threshold;
setting the max grant amount of the memory bandwidth to a first value when the accumulative time is longer than the threshold; and
setting the max grant amount of the memory bandwidth to a second value when the accumulative time is shorter than or equal to the threshold, wherein the first value is smaller than the second value.

6. The method according to claim 1, wherein the target time is an ideal decoding time for decoding the plurality of frames.

7. The method according to claim 6, wherein the step of adjusting the max grant amount of the memory bandwidth of the GPU according to the plurality of decoding times of the plurality of frames and the target time comprises:
accumulating the plurality of decoding times to obtain an accumulative time;
comparing the accumulative time with the target time;
setting the max grant amount of the memory bandwidth to a first value when the accumulative time is longer than the target time; and
setting the max grant amount of the memory bandwidth to a second value when the accumulative time is shorter than or equal to the target time, wherein the first value is smaller than the second value.

8. The method according to claim 1, further comprising:
confirming an access request of the GPU to a memory based on the max grant amount of the memory bandwidth.

9. A bandwidth-limited system, comprising:
a bus;
a graphics processing unit (GPU) coupled to the bus;
an audio/video decoder, coupled to the bus and configured to sequentially read and decode a plurality of frames of an audio/video via the bus;
a memory controller, coupled to the bus and configured to confirm an access request of the GPU to a memory based on a max grant amount of a memory bandwidth; and
a central processing unit (CPU), coupled to the bus and configured to detect a plurality of decoding times of the plurality of frames and adjust the max grant amount of the memory bandwidth of the GPU according to the plurality of decoding times of the plurality of frames and a target time, each of the plurality of decoding times being a time actually spent by the audio/video decoder for decoding a respective one of the plurality of frames of the audio/video,
wherein the max grant amount of the memory bandwidth of the GPU is a threshold for the memory controller to determine whether an access request issued by the GPU is permitted or not.

10. The bandwidth-limited system according to claim 9, wherein the target time is an ideal decoding time for decoding one of the plurality of frames.

11. The bandwidth-limited system according to claim 10, wherein the CPU calculates a time difference between one of the plurality of decoding times and the target time, respectively, accumulates the time difference to obtain an accumulative time, and adjusts the max grant amount of the memory bandwidth according to the accumulative time and a threshold.

12. The bandwidth-limited system according to claim 11, wherein the time difference equals to a difference defined by subtracting the one of the plurality of decoding times from the target time, and the CPU sets the max grant amount of the memory bandwidth to a first value when the accumulative time is shorter than the threshold and sets the max grant amount of the memory bandwidth to a second value larger than the first value when the accumulative time is longer than or equal to the threshold.

13. The bandwidth-limited system according to claim 11, wherein the time difference equals to a difference defined by subtracting the target time from the one of the plurality of decoding times, and the CPU sets the max grant amount of the memory bandwidth to a first value when the accumulative time is longer than the threshold and sets the max grant amount of the memory bandwidth to a second value larger than the first value when the accumulative time is shorter than or equal to the threshold.

14. The bandwidth-limited system according to claim 9, wherein the target time is an ideal decoding time for decoding the plurality of frames.

15. The bandwidth-limited system according to claim 14, wherein the CPU sets the max grant amount of the memory bandwidth to a first value when the plurality of decoding times is summed to be longer than the target time and sets the max grant amount of the memory bandwidth to a second value larger than the first value when the plurality of decoding times is summed to be shorter than or equal to the target time.

* * * * *